United States Patent [19]

Tseng et al.

[11] Patent Number: 5,654,385
[45] Date of Patent: Aug. 5, 1997

[54] ONE-STEP PROCESS FOR MAKING LIGHTLY-CROSSLINKED POLYVINYLPYRROLIDONE HYDROGEL

[75] Inventors: Susan Y. Tseng, Staten Island, N.Y.; Philip F. Wolf, Bridgewater; Thomas E. Royster, Piscataway, both of N.J.

[73] Assignee: ISP Investments Inc., Wilmington, Del.

[21] Appl. No.: 648,789

[22] Filed: May 16, 1996

[51] Int. Cl.$^6$ ............................ C08F 226/10; C08F 2/00
[52] U.S. Cl. ........................ 526/264; 526/62; 526/53
[58] Field of Search ................................ 526/264, 62

[56] References Cited

U.S. PATENT DOCUMENTS 5,354,823  10/1994  Tseng et al. .................... 526/264

*Primary Examiner*—Joseph L. Schofer
*Assistant Examiner*—Wu C. Cheng
*Attorney, Agent, or Firm*—Walter Katz; Marilyn J. Maue; Joshua J. Ward

[57] ABSTRACT

A one-step for making a lightly-crosslinked polyvinylpyrrolidone hydrogel by polymerizing vinyl pyrrolidone in water in the presence of a suitable crosslinker such as 1-vinyl-3(E)-ethylidene pyrrolidone and a free radical initiator under initial agitation conditions sufficient to overcome the inertia of the polymer when formed.

5 Claims, No Drawings

ONE-STEP PROCESS FOR MAKING LIGHTLY-CROSSLINKED POLYVINYLPYRROLIDONE HYDROGEL

BACKGROUND OF THE INVENTION

1. Field of the Invention

This invention relates to a process for making a lightly-crosslinked polyvinylpyrrolidone (PVP) hydrogel, and, more particularly, to a one-step process for polymerizing vinyl pyrrolidone (VP) in the presence of a crosslinker such as 1-vinyl-3(E)-ethylidene pyrrolidone (EVP) and a free radical initiator under agitation conditions sufficient to overcome the inertia of the polymer when formed.

CROSS-REFERENCE TO RELATED U.S. PATENTS AND APPLICATIONS

Tseng, S. et al., in U.S. Pat. No. 5,354,823, described a process for making a soluble polyvinylpyrrolidone solution in water by polymerizing vinyl pyrrolidone monomer, 1-vinyl-3(E)-ethylidene pyrrolidone as crosslinking agent, and t-butylperoxy pivalate as initiator, in water, at 75° C., at low monomer concentrations, e.g. 5–8% solids, and under low initial agitation conditions, e.g. at 150 rpm. The resulting lightly-crosslinked PVP polymer solution then was coated onto a substrate and cured to form an adherent coating.

Tseng, S. et al., in U.S. Pat. No. 5,362,796, described a related two-step process in which a lightly-crosslinked PVP polymer solution was formed during the first step without agitation. A rubbery product was obtained upon cooling the solution to room temperature. Then, in the second process step, the rubbery product was digested in water to form a clear, transparent polymer hydrogel, which was molded into an article of desired shape.

Tseng, S., et al., in U.S. patent application Ser. No. 08/528,383, filed Sep. 13, 1995, (FDN-2216), now allowed, described a two-step process for making a homogenized, flowable hydrogel of lightly-crosslinked PVP polymer for use in cosmetic compositions.

Tseng, S., et al., in U.S. patent application Ser. No. 08/565,605, filed Nov. 30, 1995, (FDN-2372/2352), now allowed, disclosed a non-irritating skin and hair rejuvenating composition including a micronized hydrogel of a lightly-crosslinked N-vinyl lactam polymer.

Tseng, S., et al., in U.S. Pat. Nos. 5,391,668; 5,393,854; and 5,360,883; provided a method for making the EVP crosslinker used in such polymerization processes.

The processes described in these patents and patent applications are not particularly suitable for making a lightly-crosslinked PVP polymer hydrogel in one-step, which hydrogel is suitable for micronizing in a subsequent step.

Accordingly, it is an object of this invention to provide a one-step process for making a lightly-crosslinked polyvinylpyrrolidone polymer hydrogel suitable for micronizing.

This and other objects and features of the invention will be made apparent from the following description and disclosure.

SUMMARY OF THE INVENTION

A one-step process for making a lightly-crosslinked PVP polymer hydrogel suitable for micronizing is described herein. The feature of the invention is a single process step comprising polymerizing VP in water in the presence of a crosslinker such as EVP and a free radical initiator under initial agitation conditions sufficient to overcome the inertia of the polymer hydrogel when formed, whereby the polymer is kept in the hydrogel state and is available for micronizing thereafter.

DETAILED DESCRIPTION OF THE INVENTION

A. Polymerization

In accordance with the invention, there is provided herein a process for making a lightly-crosslinked PVP polymer hydrogel in which both the polymerization and hydrogel digestion steps occur in one-step, and the resulting product is the desired lightly-crosslinked PVP hydrogel, in a state suitable for micronizing.

The PVP hydrogel of this invention is derived from the homopolymerization or copolymerization of N-vinyl pyrrolidone and/or N-vinyl caprolactam monomers, in water, in the presence of a suitable amount of crosslinking agent, generally in an amount of about 0.01 to about 5% by weight based on the monomer, preferably between about 0.1 and about 2%.

In practicing the invention, the reactants are subjected to an agitation condition which is sufficient to overcome the inertia of the polymer when it is formed, i.e. at the moment the VP monomer polymerizes. In the presence of the water solvent, the resultant polymer is immediately digested to form the desired lightly-crosslinked PVP hydrogel. In the hydrogel state, the polymer is immediately available for micronizing.

At this point, the process is continued by heating the product at a high temperature to substantially reduce the residual monomer levels. Thereafter the purified polymer hydrogel is transferred to a storage tank and water is added to fully swell the hydrogel polymer. After decanting excess water, the swollen hydrogel is micronized by homogenization to provide a micronized and flowable PVP hydrogel product.

The N-vinyl lactam monomer may be combined with a polymerizable comonomer, preferably in an amount not more than 30% of the comonomer. Suitable comonomers are those which are soluble in the reaction solvent and include olefinically unsaturated compounds such as N-vinyl formamide, N-vinyl pyrrolidone, N-vinyl caprolactam, vinyl acetate, ammonium and alkali salts of acrylic acid and methacrylic acid, acrylamide, methacrylamide, lower alkyl acrylates or methacrylates, acrylonitrile, vinyl chloride, hydroxyalkyl acrylates or methacrylates, hydroxybutyl vinyl ether, quaternized dimethylamino lower alkyl acrylates or methacrylates and the like.

Representative of the crosslinking agents which can be employed are N-vinyl-3(E)-ethylidene pyrrolidone (EVP); ethylidene bis(N-vinyl pyrrolidone) (EBVP); diallylimidazolidone; divinyl ether of diethylene glycol; pentaerythritol triallyl ether (PETE); triallyl-1,3,5-triazine-2,4,6-(1H,3H,5H)trione (TATT); ethylene glycol diacrylate; 2,4,6-triallyloxy-1,3,5-triazine; 1,7-octadiene; 1,9-decadiene; divinyl benzene; methylenebis(methacrylamide); methylenebis(acrylamide); N,N-divinylimidazolidone; and ethylene glycol diacrylate. EVP is preferred.

Preferred products of this invention are those derived from N-vinyl pyrrolidone homopolymer or N-vinyl pyrrolidone/N-vinyl caprolactam copolymer which are lightly-crosslinked with EVP, EBVP or divinylimidazolidone. Most preferred is the EVP crosslinked N-vinyl pyrrolidone homopolymer.

The solvent used in the above polymer synthesis can be water, lower alkanol, e.g. $C_1$ to $C_4$ alkanol, glycerol, or a mixture thereof; although deionized water is preferred. The amount of solvent employed can vary over a wide range; however, between about 65% and 85% of the reaction mixture is usually sufficient to dissolve all reactive components.

Generally about 10–30% of the reaction mixture is VP, preferably about 20% by weight.

The reaction temperature is about 50°–95° C., preferably about 70° C.

Suitable polymerization initiators, more often employed in a concentration of from about 0.1 to about 3 wt. %, are free radical catalysts having 10 hours half-life temperature and a decomposition temperature below the boiling point of the solvent employed. Such initiators include diacyl peroxides such as diacetyl peroxide, dibenzoyl peroxide, dilauroyl peroxide; peresters such as t-butylperoxy pivalate, t-butyl peroctoate, t-amylperoxy pivalate, t-butylperoxy-2-ethyl hexanolate; percarbonates such as dicyclo hexyl peroxy dicarbonate, as well as azo compounds such as 2,2'-azo-bis (isobutyrolnitrile), 2,2'-azo-bis(2,4-dimethyl-valeronitrite), 2,2'-azo-bis(cycanocyclohexane) and mixtures thereof. Organic peroxides are preferred.

Post-heating at high temperatures, e.g. at 110° C. will reduce the residual monomer levels and provide a purified product.

B. Micronization

The lightly-crosslinked PVP hydrogel of the invention then is saturated in from about 5 to about 800 volumes of water for a period of from about 5 hours to about 2 days to fully swell the polymer. The resulting composition contains between about 0.5 and 15 wt. % of the lightly-crosslinked polymer and between about 85 to 99.5 wt. % water. Generally the swollen polymer contains about 4–6% polymer. In this state, the swollen gel can be micronized by homogenization in any acceptable manner described in the references cited above.

Properties of Product of Invention

The micronized PVP hydrogel of the invention possesses many beneficial properties. For example, it maintains its original viscosity over a broad pH range, thus enabling formulation to a desired consistency with both acid and basic components. The active components can be those used in personal care and pharmaceutical applications. More specifically, the present products are valuable carriers in concentrations of from about 75 to about 99.9 wt. %, preferably from about 80 to about 98 wt. % of the total composition containing an active component. Suitable active components include those employed in sun blocks; hair bleaches; depilation; skin depigmentation, rejuvenation, disinfection, moisturizing, softening and defoliation. Since the present carriers are colorless and not irritating to the skin, they can be applied in formulations over a wound or employed in wound dressings without staining and without the customary stinging or burning sensation on the skin. The flowable hydrogels of this invention are more skin substantive than their non-flowable counterparts and prolong the efficacy of active components by forming a skin barrier which resists evaporation. As a dentifrice fixing agent, the flowable property of instant hydrogels permits better conformity with gums thus providing a more comfortable fit.

The invention will now be described more fully with reference to the following working examples.

EXAMPLE 1

A. Polymerization

An aqueous solution of 119.64 g of vinyl pyrrolidone monomer, 0.36 g of 1-vinyl-3(E)-ethylidene pyrrolidone crosslinking agent, 0.60 g of t-butylperoxy pivalate (Lupersol® 554) initiator, and 480 g of water, were charged to a nitrogen purged, 1—1 Bü chi BEP 280 glass reactor equipped with an anchor agitator and an oxygen analyzer for maintaining an oxygen level below 20 ppm. The reactor was sealed under a 0.14 bar nitrogen pressure and the contents were heated to 65° C. The reaction mixture then was subjected to high speed agitation at 814 rpm. After a reaction period of 2 hours at 65° C. (and post-heating at 110° C. for 1 hour), a purified, lightly-crosslinked polyvinylpyrrolidone hydrogel was obtained. During this initial heating period, polymerization occurred and the viscosity of the polymer gel obtained started to increase. The high speed agitation provided, however, overcame the inertia of the polymer as formed, and provided the gel product in a condition suitable for micronizing.

B. Micronization

The system then was cooled to room temperature and the gel product was transferred with 3.5 l of water to a 4-l glass flask and allowed to swell to its maximum volume. Excess water was decanted and the swollen gel was transferred to a 5-l stainless steel vessel for micronization using a Ross Homogenizer, Model ME 100LC. After micronization, a flowable, micronized PVP polymer hydrogel was obtained which passed through a 40 mesh screen. The solids content of the product was about 5%, and the Brookfield viscosity was about 35,000 cps.

EXAMPLE 2

The procedure of Example 1 was followed except that an EVP/VP solution was used as the crosslinker. The reaction mixture was VP 111.34 g, EVP/VP solution, 8.66 g (2.77%), distilled water 480 g and Lupersol 554, 0.60 g. Similar results were obtained as in Example 1.

EXAMPLE 3

The procedure of Example 1 was followed with the following reactants, EVP/VP solution, 8.66 g (2.77%), VP, 99.34 g, vinylcaprolactam, 12.0 g, distilled water 480 g, and Lupersol 554, 0.90 g. Similar results were obtained as in Example 1.

EXAMPLE 4

The procedure of Example 1 was followed using EVP crystals as the crosslinker. The reaction mixture was EVP crystals, 0.24 g, VP monomer, 107.76 g, vinylcaprolactam 12 g, distilled water 480 g, and Lupersol 554 0.90 g. Similar results were obtained.

While the invention has been described with particular reference to certain embodiments thereof, it will be understood that changes and modifications may be made which are within the skill of the art. Accordingly, it is intended to be bound only by the following claims.

What is claimed is:

1. A one-step process for making a lightly-crosslinked polyvinylpyrrolidone (PVP) polymer or copolymer hydrogel suitable for subsequent micronizing which comprises polymerizing vinyl pyrrolidone (VP), optionally with a comonomer in water in the presence of a crosslinker and a free radical initiator under high speed initial agitation conditions of sufficient magnitude of at least about 800 rpm to overcome the inertia of the polymer when formed thereby directly providing the product as the desired hydrogel.

2. A one-step process according to claim 1 wherein the crosslinker is 1-vinyl-3(E)-ethylidene pyrrolidone (EVP) in an amount of 0.01 to 5% by weight of the monomer.

3. A one-step process according to claim 2 wherein said amount is 0.1 to 2%.

4. A one-step process according to claim 1 wherein about 10–30% vinyl pyrrolidone monomer is present in the reaction mixture.

5. A one-step process according to claim 1 which is carried out at about 50°–90° C.

* * * * *